March 22, 1960 C. A. CHAYNE 2,929,261
TRANSMISSION SELECTOR CONTROL
Filed Feb. 6, 1957 2 Sheets-Sheet 1

INVENTOR.
Charles A. Chayne
BY
W. C. Middleton
ATTORNEY.

March 22, 1960

C. A. CHAYNE 2,929,261

TRANSMISSION SELECTOR CONTROL

Filed Feb. 6, 1957

INVENTOR.
Charles A. Chayne
BY
W. C. Middleton
ATTORNEY.

United States Patent Office 2,929,261
Patented Mar. 22, 1960

2,929,261

TRANSMISSION SELECTOR CONTROL

Charles A. Chayne, Bloomfield Hills, Mich., assignor to General Motors Corporation, Detroit, Mich., a corporation of Delaware Application February 6, 1957, Serial No. 638,545

7 Claims. (Cl. 74—484)

This invention relates to motor vehicle controls and particularly to vehicle controls for transmissions and accessories.

In the improvement of motor vehicles, there is a constant effort to reduce the number of manual controls that a driver must be trained to manipulate. But, despite a trend towards automation and simplicity, some vehicle driver efforts are still essential. For example, although the drive ratios change automatically in some transmissions, the operator must still set the transmission manually, for neutral, forward drive and reverse drive. For such controls to be acceptable, they must not only be easily operated but also accessible to the operator with a minimum of inconvenience, i.e., the driver should not be required to reach any substantial distance to operate a particular control. Furthermore, safety is a concern since the controls must be of the type that an operator would not inadvertently operate under normal conditions.

With the foregoing considerations in mind, it is proposed that a motor vehicle transmission control be combined with one or more of the vehicle accessory operating devices to reduce the number of individual controls. The invention provides a combined control especially arranged to be accessible to the driver for convenient operation without the use of any unusual operator techniques. Specifically, the invention provides a control that may be operated in a conventional manner, eliminating a need for special driver training, while discouraging any undesired and inadvertent operation.

In carrying out the invention, a transmission control for maneuvering a transmission to the preferred operating positions is combined with an accessory operating device, e.g., a horn operating device, both of which can be operated by a manually operated means accessible within the area defined by a steering wheel. The arrangement is such that operation of the horn operating device does not interfere with operation of the transmission control since the motions required, although conventional, are quite different. That is, the manually operated means is depressed to blow the horn and rotated to reposition the transmission control.

The foregoing and other objects and advantages will be apparent form the following description and from the accompanying drawings in which.

Figure 1:
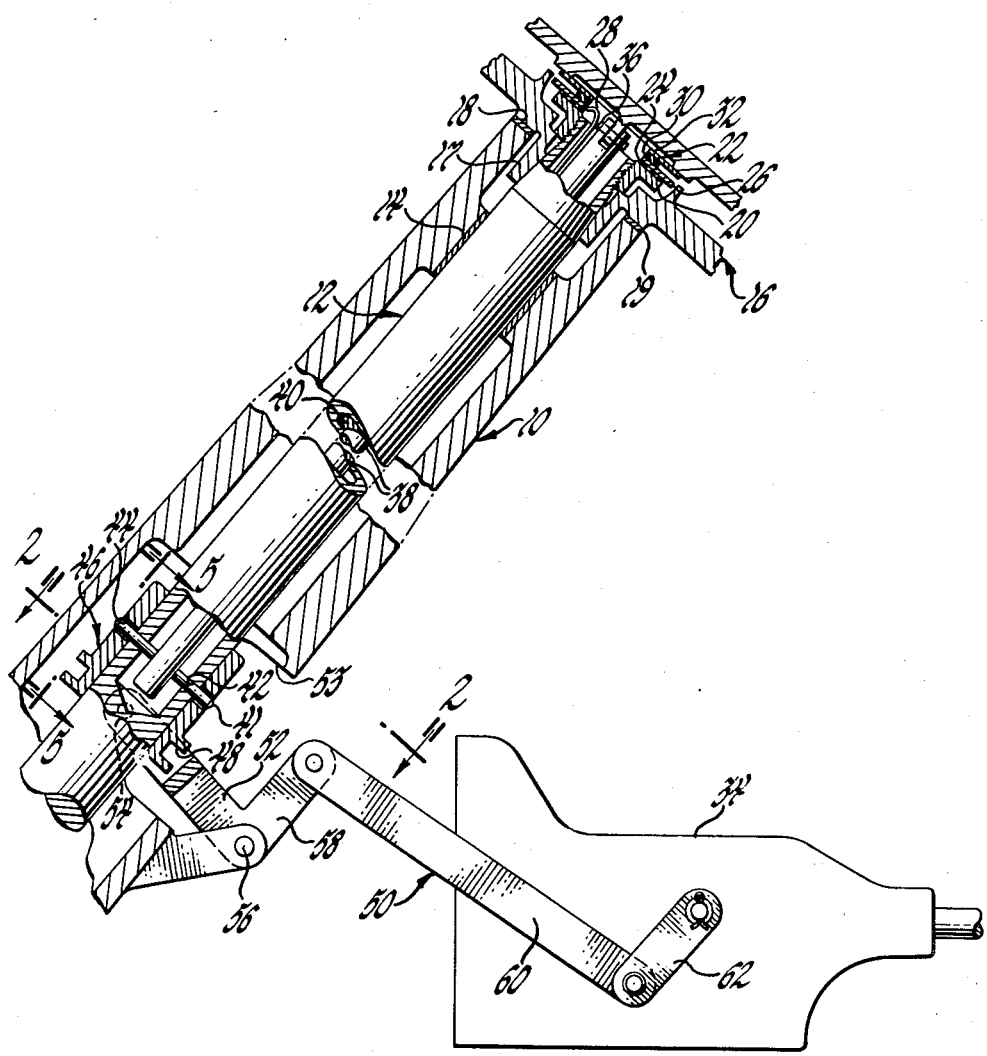
Figure 1 is a sectional view of an embodiment of the invention shown mounted on a steering column and combind with a transimssion.

In Figure 1, a support or steering column 10 is demonstrated concentrically mounted about a steering shaft 12. The steering shaft 12 is rotatably journalled therein by a sleeve bearing 14. On the upper end of the steering shaft 12, a steering member or wheel 16 is press fitted or otherwise secured at a hub portion 17 to a tapered surface on the shaft 12. The hub 17 abuts along a bottom flange 18 thereof a bearing spacer 19 which is interposed between the upper end of the steering column 10 and the hub 17. Steering wheel 16 is retained on the steering shaft 12 by a flanged lock nut 20 that threadedly engages the upper terminal end of the steering shaft 12.

Figure 4:
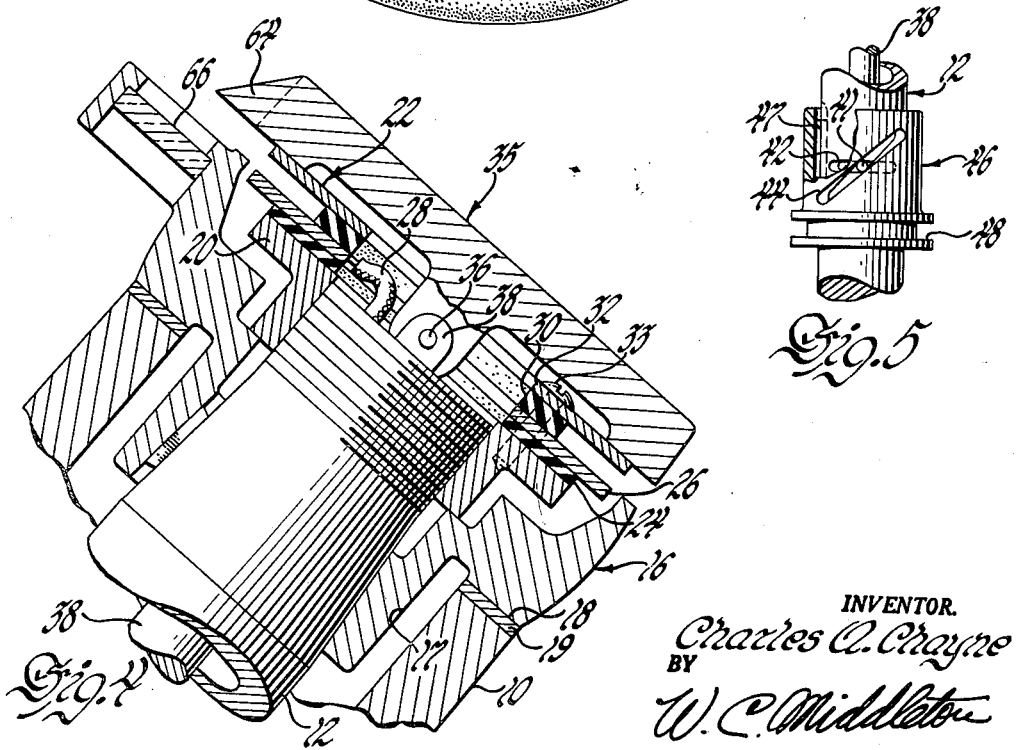
Figure 4 is an enlarged partial sectional view of the upper end of the steering column.

As best seen in Figure 4, an accessory operating device, such as the horn operating device 22, is attached to the flanged lock nut 20. Adjacent the upper face of the lock nut 20, an insulator ring 24 is disposed which in turn supports a contact plate 26. Plate 26 is connected through an electrical conductor 28 to a horn system (not shown). Spaced from contact plate 26 by an intermediate insulator ring 30 is a flexible metallic plate 32. Ring 24, plate 26, ring 30 and plate 32 are all retained on the lock nut 20 by screws 33.

Figure 5:
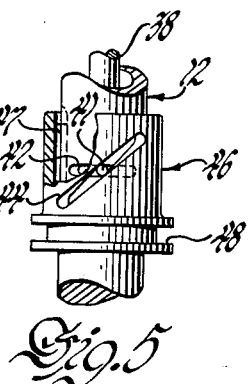
Figure 5 is a fragmentary sectional view of a shift sleeve.

For actuating the horn operating device 22 and for controlling the transmission 34, a manual control member or ring 35, is pivotally connected at 36 to a transmission control shaft 38 and remains in light engagement with flexible plate 32. Transmission control shaft 38 is concentrically journalled by a sleeve bearing 40 within the steering shaft 12. With reference to Figures 1 and 5, adjacent an end opposite the pivotal connection 36, a drive pin 41 is fixedly arranged to extend substantially equidistant and transversely from the axis of the control shaft 38 through diametrically opposed slots 42 in the steering shaft 12 and diagonal slots 44 in a shift member or sleeve 46. Shift sleeve 46 is longitudinally slidable on the steering shaft 12 and is prevented against rotation by oppositely disposed keys 47 (see Figure 2). At the lower end of the shift sleeve 46, an annular groove 48 is formed which transfers motion of the sleeve 46 through linkage 50 to the transmission 34.

Figure 2:
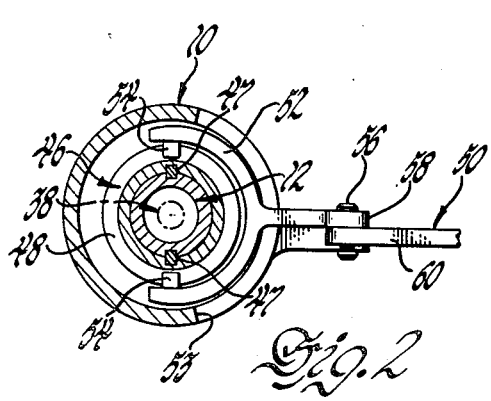
Figure 2 is a sectional view of the steering column taken along the lines 2—2 of Figure 1.
Figure 3:
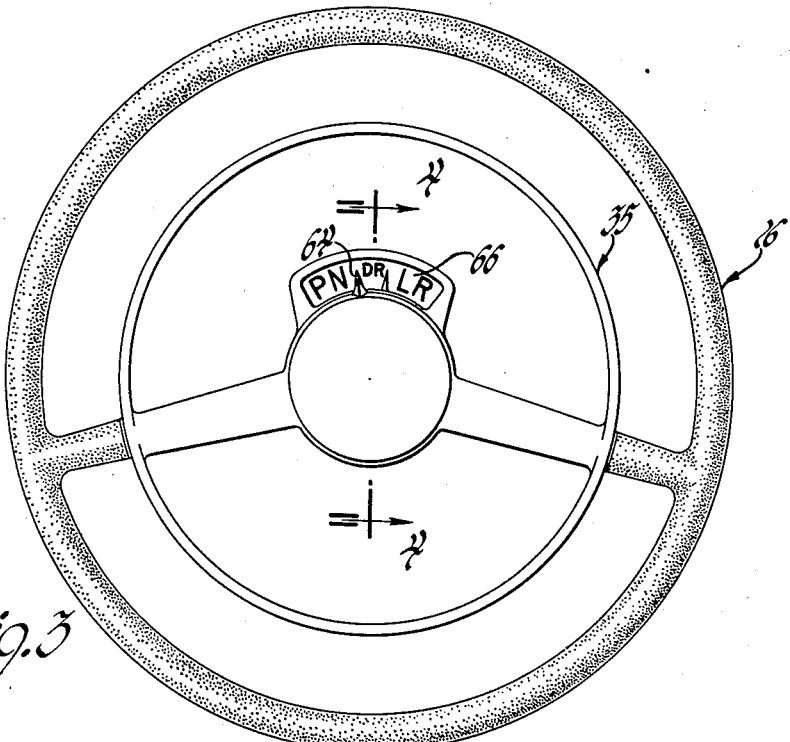
Figure 3 is a view illustrating the position of a combined control member relative to a steering wheel.

The linkage 50 comprises a trunnion or yoke 52 that extends through an opening 53 in the steering column 10 which yoke has diametrically oppositely disposed pin ends 54 as depicted in Figure 2, recevied in the annular groove 48 of sleeve 46. The yoke 52 is pivotally connected at 56 to the steering column 10 and has a transverse leg 58 connected to an interconnecting link 60 interposed between leg 58 and an external transmission shift lever 62.

The control ring 35 has a pointer 64 adjacent a transmission position indicator dial 66 that may be either mounted on or integral with the steering wheel hub 17. Therefore, rotation of the control ring 35 to the indicated positions on the dial 66, will rotate the transmission control shaft 38. Then, through drive pin 41 and slots 42 and 44 the shift sleeve 46 will move longitudinally on the steering shaft 12 without interfering with movement of the steering shaft 12. When the shift sleeve 46 moves, the linkage 50 will alter the transmission drive by rotating transmission shift lever 62.

If the operator wishes to blow the vehicle horn, then the control ring 35 is shifted or tilted about the pivotal connection 36, while maintaining the position of the transmission control shaft 36, to engage the outer extremity of the flexible plate 32 with the contact plate 26. This engagement provides a suitable ground through the control ring 35, control shaft 38, and the steering column 10 to the vehicle frame (not shown), hence, completing the circuit for energizing and operating the horn system in a known manner. When the steering wheel 16 is turned, steering shaft 12 is rotated to steer the vehicle. At the same time, control ring 35 and control shaft 38 will be rotated the same amount because of the interconnection of steering shaft 12 and control shaft 38 through drive pin 41 and slots 42. During rotation of the steering wheel 16, the position of the linkage 50 will be maintained by some suitable detent mechanism (not shown) in the transmission 34. Consequently, the shift sleeve 46 remains stationary.

I claim:

1. In combination with a steering column, a steering sleeve rotatably mounted within the steering column, a transmission control shaft rotatably mounted within the steering sleeve, a horn operating device mounted on the steering column, a control member both rotatable for operating the transmission control shaft and tiltable for actuating the horn operating device, a steering member with a hub portion secured to the steering sleeve between an end of the steering column and the control member, and a transmission shift member mounted on the steering sleeve and having a connection with the transmission control shaft for allowing relative movement between the steering sleeve and the transmission control shaft when the control member is rotated relative to the steering member and for permitting joint movement of the transmission control shaft and the steering sleeve when the steering member is rotated.

2. In combination with a steering column, a steering sleeve having a slot in one end thereof rotatably mounted within the steering column, a transmission control shaft rotatably mounted within the steering sleeve and including a drive portion at one end thereof, a horn operating device mounted on the steering column, a control member attached to an end of the transmission control shaft opposite the end with the drive portion, the control member being both rotatable for operating the transmission control shaft and tiltable for actuating the horn operating device, a steering member with a hub portion secured to the end of the steering sleeve opposite the end with the slot, the steering member being disposed between an end of the steering column and the control member, and a transmission shift member mounted on the steering sleeve and having a diagonally extending slot therein, the transmission control shaft drive portion extending through the slots in the steering sleeve and the shift member to allow relative movement between the steering sleeve and the transmission control shaft when the control member is rotated relative to the steering member and for permitting joint movement of the transmission control shaft and the steering sleeve when the steering member is rotated.

3. In combination with a steering column and a transmission, steering and transmission control shafts rotatably supported by the steering column, an accessory operating device supported by the steering column, a control member both rotatable for operating the transmission control shaft and shiftable for actuating the accessory operating device, a shift member slidably mounted on the steering shaft and having a connection with the transmission control shaft for allowing relative movement between the transmission control shaft and the steering shaft when the control member is rotated and for permitting joint movement of the transmission control shaft and the steering shaft when the steering member is rotated, and linkage interconnecting the transmission and the shift member for controlling the transmission.

4. In combination with a steering column and a transmission, a steering sleeve rotatably mounted within the steering column, a transmission control shaft rotatably mounted within the steering sleeve, a horn operating device mounted on the steering column, a control ring both rotatable for operating the transmission control shaft and tiltable for actuating the horn operating device, a steering wheel with a hub portion secured to the steering sleeve between an end of the steering column and the control ring, a shift member slidably mounted on the steering shaft and connected to the transmission control shaft to allow relative movement between the transmission control shaft and the steering sleeve when the control member is rotated relative to the steering wheel and for permitting joint movement of the transmission control shaft and the steering shaft when the steering member is rotated, and linkage interconnecting the transmission and the shift member for controlling the transmission.

5. In combination with a steering column and a transmission, a steering sleeve having a slot in one end thereof rotatably mounted within the steering column, a transmission control shaft rotatably mounted within the steering sleeve and including a drive portion at one end thereof, a horn operating device mounted on the steering column, a control ring attached to an end of the transmission control shaft opposite the end with the drive portion, the control ring being both rotatable for operating the transmission control shaft and tiltable for actuating the horn operating device, a steering wheel with a hub portion secured to an end of the steering sleeve opposite the end with the slot, the steering wheel being disposed between an end of the steering column and the control ring, a transmission shift member slidably mounted on the steering sleeve and having a diagonally extending slot therein, the transmission control shaft drive portion extending through the slots in the steering sleeve and the shift member to allow relative movement between the extending shaft and the transmission control shaft when the control member is rotated relative to the steering wheel and for permitting joint movement of the transmission control shaft and the steering sleeve when the steering member is rotated, and linkage interconnecting the transmission and the shift member for controlling the transmission.

6. In combination with a steering column, a steering sleeve rotatably mounted within the steering column, a transmission control shaft rotatably mounted within the steering sleeve, an accessory operating device, a control member both rotatable for operating the transmission control shaft and tiltable for actuating the accessory operating device, an output member positioned externally of the steering sleeve, and means for transferring the movement of the transmission control shaft through the steering sleeve and to the output member.

7. In combination with a steering column and a transmission, a steering sleeve rotatably mounted within the steering column, a transmission control shaft rotatably mounted within the steering sleeve, an accessory operating device, a manual control arranged both for revolvable movement so as to revolve the transmission control shaft therewith and tiltable movement from the plane of rotary movement for actuating the accessory operating device, means for returning the control member from the tilted position to the plane of rotary movement upon removal of restraint therefrom, an output member, motion translating means disposed between the transmission control shaft and the output, the motion translating means being so arranged as to convert the rotatable movement of the transmission control shaft to rectilinear movement of the output member, and linkage interconnecting the transmission and the output member.

References Cited in the file of this patent

UNITED STATES PATENTS

| 902,944 | Davis | Nov. 3, 1909 |
| 1,016,750 | King | Feb. 6, 1912 |
| 1,020,889 | Daehler | Mar. 19, 1912 |
| 1,690,973 | Gordon et al. | Nov. 6, 1928 |
| 1,933,908 | Hoppenstand | Nov. 7, 1933 |
| 2,270,550 | Oswald | Jan. 20, 1942 |

FOREIGN PATENTS

| 155 | Great Britain | Jan. 2, 1906 |